United States Patent
Chang et al.

(10) Patent No.: US 11,874,985 B2
(45) Date of Patent: Jan. 16, 2024

(54) LARGE TOUCH DISPLAY INTEGRATED SYSTEM AND DRIVING SIGNAL PROCESSING METHOD THEREOF

(71) Applicant: HIMAX TECHNOLOGIES LIMITED, Tainan (TW)

(72) Inventors: Yaw-Guang Chang, Tainan (TW); Pei Yao Chang, Tainan (TW); De Wei Shen, Tainan (TW); Yi Wen Wang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/156,386

(22) Filed: Jan. 19, 2023

(65) Prior Publication Data
US 2023/0236690 A1    Jul. 27, 2023

Related U.S. Application Data (60) Provisional application No. 63/303,037, filed on Jan. 26, 2022.

(51) Int. Cl.
G06F 3/041    (2006.01)
G06F 3/044    (2006.01)
G06F 3/147    (2006.01)

(52) U.S. Cl.
CPC ............ *G06F 3/0412* (2013.01); *G06F 3/044* (2013.01); *G06F 3/147* (2013.01)

(58) Field of Classification Search
CPC ... G09G 2300/0408; G09G 2310/0218; G09G 2310/0289; G09G 2310/0297; G09G 2370/08
See application file for complete search history.

(56) References Cited

U.S. PATENT DOCUMENTS

| | | | | |
|---|---|---|---|---|
| 6,157,393 A | * | 12/2000 | Potter | G09G 5/395 345/506 |
| 2002/0075214 A1 | * | 6/2002 | Kim | G02F 1/13452 345/88 |
| 2008/0111925 A1 | * | 5/2008 | Kato | G09G 3/3688 348/E9.037 |
| 2015/0035797 A1 | * | 2/2015 | Shahparnia | G06F 3/041661 345/87 |
| 2017/0084228 A1 | * | 3/2017 | Kwak | G09G 3/20 |
| 2018/0240397 A1 | * | 8/2018 | Hara | G09G 3/30 |
| 2021/0216168 A1 | * | 7/2021 | Kremin | G06F 1/1626 |

* cited by examiner

*Primary Examiner* — Ryan A Lubit
(74) *Attorney, Agent, or Firm* — CKC & Partners Co., LLC (57) ABSTRACT

A driving signal processing method for a large touch display integrated (LTDI) system is provided. The LTDI system includes plural LTDI chips that are concatenated. The LTDI chips include a master LTDI chip and plural slave LTDI chips. The driving signal processing method includes: receiving, by the LTDI chips, display data from a timing controller; and dispersedly outputting, by the master LTDI chip and at least one of the slave LTDI chips, M gate control signals respectively corresponding to M gate lines of a display panel of the LTDI system according to the display data during the display stage of the display panel.

17 Claims, 7 Drawing Sheets

LARGE TOUCH DISPLAY INTEGRATED SYSTEM AND DRIVING SIGNAL PROCESSING METHOD THEREOF

RELATED APPLICATIONS

This application claims priority to U.S. Provisional Application Ser. No. 63/303,037, filed Jan. 26, 2022, the disclosures of which are incorporated herein by reference in their entireties.

BACKGROUND

Field of Invention

The present invention relates to a large touch display integrated (LTDI) system. More particularly, the present invention relates to a large touch display integrated (LTDI) system and a driving signal processing method thereof.

Description of Related Art

In some applications, the electronic devices may have display function and touch sensing function to obtain a better user experience. For such applications, two driver chips (i.e., display driver chip and touch detection chip) are needed to drive the display panel with touch sensors, thereby performing display operation and touch sensing operation. In related application technologies of large touch display devices such as notebook, automobiles or televisions, in order to reduce the cost, the said two driver chips are integrated into a large touch display integrated (LTDI) chip. The LTDI chips can drive the display panel with touch sensors, thereby performing display operation and touch sensing operation.

In the application of the current LTDI system, a master LTDI chip is provided to centrally send many control signals required for the display stage to the subsequent display elements. However, this will result in too many pins of the master LTDI chip, thereby limiting the use conditions of the LTDI chip packaging and increasing the cost.

SUMMARY

The present invention provides a driving signal processing method used in a large touch display integrated (LTDI) system. The LTDI system includes plural LTDI chips that are concatenated. The LTDI system includes a display panel and a printed circuit board (PCB). The display panel includes the LTDI chips. The PCB includes a timing controller. The LTDI chips include a master LTDI chip and plural slave LTDI chips. The driving signal processing method includes: receiving, by the LTDI chips, display data from the timing controller; and dispersedly outputting, by the master LTDI chip and at least one of the slave LTDI chips, M gate control signals respectively corresponding to M gate lines of the display panel according to the display data during a display stage of the display panel. M is a positive integer greater than 1.

In accordance with one or more embodiments of the invention, the driving signal processing method further includes: dispersedly outputting, by the master LTDI chip and the at least one of the slave LTDI chips, the M gate control signals to a level shifter of the PCB according to the display data during the display stage of the display panel, such that the level shifter correspondingly provides gate driving signals to the M gate lines of the display panel. Each of the M gate control signals is an output selection signal.

In accordance with one or more embodiments of the invention, a gate driver of the display panel is formed on a substrate of the display panel through a gate-in-panel (GIP) manner.

In accordance with one or more embodiments of the invention, the driving signal processing method further includes: dispersedly outputting, by the master LTDI chip and the at least one of the slave LTDI chips, the M gate control signals to a gate driver of the display panel according to the display data during the display stage of the display panel, such that the gate driver correspondingly provides driving signals to the M gate lines of the display panel. Each of the M gate control signals is a clock signal.

In accordance with one or more embodiments of the invention, the gate driver is formed on a substrate of the display panel through a gate-in-panel (GIP) manner.

In accordance with one or more embodiments of the invention, the number of the LTDI chips is N. N is a positive integer greater than 1 and N<M. Each of the LTDI chips is used to output M/N gate control signals.

In accordance with one or more embodiments of the invention, adjacent two of the LTDI chips communicate synchronously through a reference clock signal.

In accordance with one or more embodiments of the invention, the LTDI chips perform a spread spectrum modulation through the reference clock signal.

The present invention further provides a large touch display integrated (LTDI) system. The LTDI system includes a printed circuit board (PCB) and a display panel. The PCB includes a timing controller. The display panel includes plural LTDI chips that are concatenated. The LTDI chips include a master LTDI chip and plural slave LTDI chips. The LTDI chips receive display data from the timing controller. The master LTDI chip and at least one of the slave LTDI chips dispersedly output M gate control signals respectively corresponding to M gate lines of the display panel according to the display data during a display stage of the display panel. M is a positive integer greater than 1.

In accordance with one or more embodiments of the invention, the display panel is an in-cell liquid crystal display panel. The LTDI chips are connected through a serial peripheral interface. Each of the LTDI chips includes a touch microcontroller (MCU), a touch analog front end (AFE), and a source driver.

In accordance with one or more embodiments of the invention, the PCB further includes a level shifter. The master LTDI chip and the at least one of the slave LTDI chips dispersedly output the M gate control signals to the level shifter according to the display data during the display stage of the display panel, such that the level shifter correspondingly provides gate driving signals to the M gate lines of the display panel. Each of the M gate control signals is an output selection signal.

In accordance with one or more embodiments of the invention, the display panel further includes a gate drive. The gate driver is formed on a substrate of the display panel through a gate-in-panel (GIP) manner.

In accordance with one or more embodiments of the invention, the display panel further includes a gate driver. The master LTDI chip and the at least one of the slave LTDI chips dispersedly output the M gate control signals to the gate driver according to the display data during the display stage of the display panel, such that the gate driver correspondingly provides driving signals to the M gate lines of the display panel. Each of the M gate control signals is a clock signal.

In accordance with one or more embodiments of the invention, the gate driver is formed on a substrate of the display panel through a gate-in-panel (GIP) manner.

In accordance with one or more embodiments of the invention, the number of the LTDI chips is N. N is a positive integer greater than 1 and N<M. Each of the LTDI chips is used to output M/N gate control signals.

In accordance with one or more embodiments of the invention, adjacent two of the LTDI chips communicate synchronously through a reference clock signal.

In accordance with one or more embodiments of the invention, the LTDI chips perform a spread spectrum modulation through the reference clock signal.

In order to let above mention of the present invention and other objects, features, advantages, and embodiments of the present invention to be more easily understood, the description of the accompanying drawing as follows.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present invention are further described in detail below with reference to the accompanying drawings, however, the embodiments described are not intended to limit the present invention and it is not intended for the description of operation to limit the order of implementation.

Figure 1:
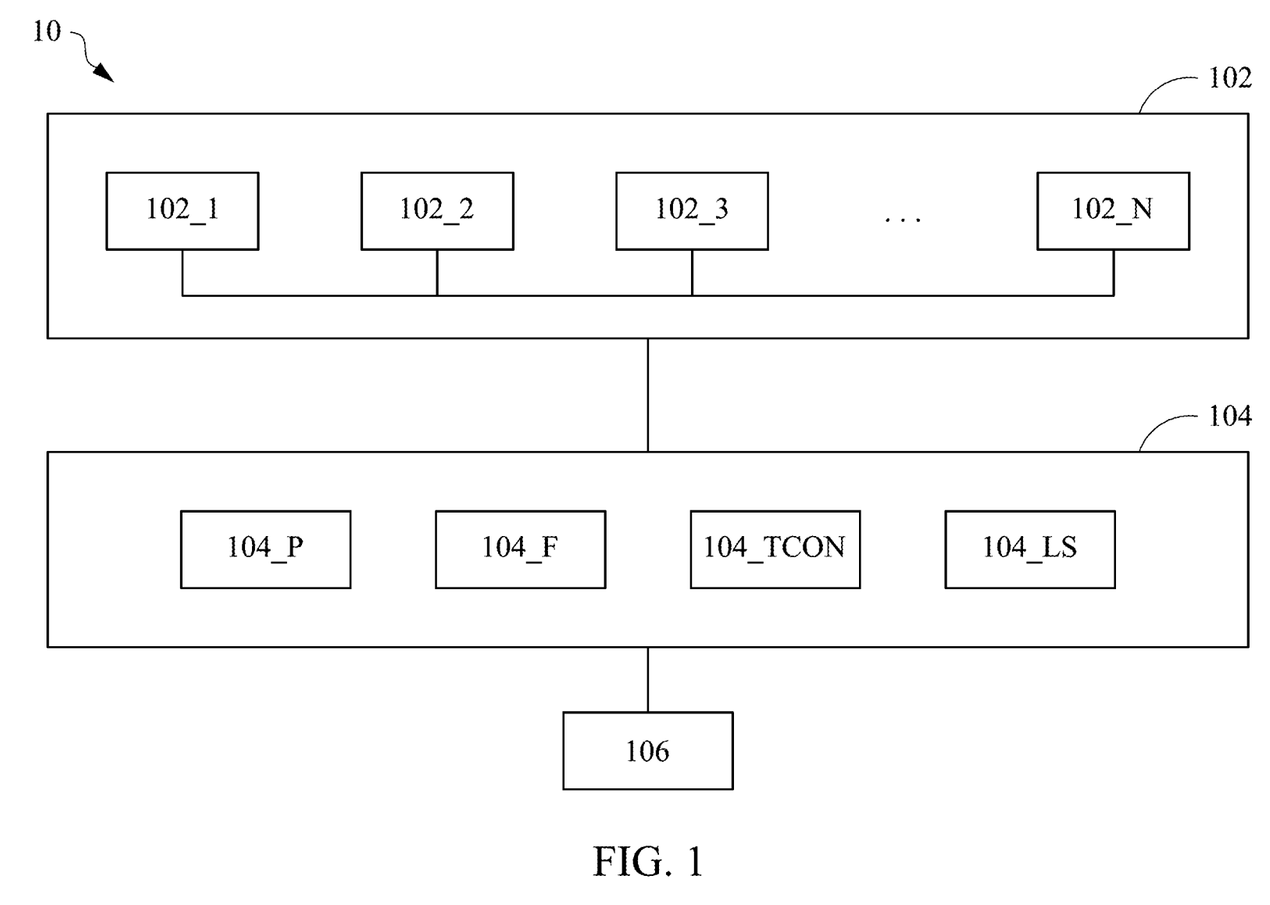
FIG. 1 illustrates a block diagram of a large touch display integrated (LTDI) system according to some embodiments of the present invention.

FIG. 1 illustrates a block diagram of a large touch display integrated (LTDI) system 10 according to some embodiments of the present invention. The LTDI system 10 includes a display panel 102, a printed circuit board (PCB) 104, and a host system 106.

The display panel 102 may be an in-cell liquid crystal display (LCD) panel. The display panel 102 includes N LTDI chips 102_1~102_N. Specifically, the number N of the LTDI chips usually depends on the resolution of the display panel 102. The higher the resolution is, the larger the number N of the LTDI chips is.

The LTDI chips 102_1~102_N are concatenated for driving display pixels (not shown) of the display panel, thereby performing display operation during the display stage of the display panel 102 and performing touch sensing operation during the touch sensing stage of the display panel 102.

The LTDI chip 102_1 is defined as a master LTDI chip in the present invention. The LTDI chips 102_2~102_N are defined as slave LTDI chips in the present invention. The slave LTDI chips 102_2~102_N are connected to the master LTDI chip 102_1 through a serial peripheral interface.

Each of the LTDI chips 102_1~102_N may include a touch microcontroller (MCU), a touch analog front end (AFE), a touch sensing module, and a source driver. The touch sensing module is used to sense the physical area in the visible area of the display panel 102 corresponding to each of the LTDI chip 102_1~102_N, thereby generating plural touch sensing data. The touch MCU is used to collect and process the touch sensing data, thereby determining the coordinate information of the touch position.

The PCB 104 is used to controller the display panel 102. The PCB 104 may include a level shifter 104_LS, a timing controller 104_TCON, a power IC 1042, and a flash memory 104_F, but the present invention is not limited thereto.

The timing controller 104_TCON has an embedded display port (eDP) for receiving display data DIM for the host system 106. The timing controller 104_TCON is used to output display data DIM to the LTDI chips 102_1~102_N. The display data DIM includes vertical synchronization signal (VSYNC), horizontal synchronization signal (HSYNC), data enable signal (Data Enable, DE), main clock signal (MCLK), etc., but the present invention is not limited thereto.

In the current LTDI system, the master LTDI chip centrally sends multiple gate control signals to the subsequent display elements according to the display data received from the timing controller during the display stage of the display panel, so as to provide gate drive signals to multiple gate lines of the display panel, thereby sequentially providing on-voltage or off-voltage to multiple gate lines. The on-voltage is used to turn on the display pixels connected to the corresponding gate line and the off-voltage is used to turn off the display pixels connected to the corresponding gate line. However, such approach of the current LTDI system will result in too many pins of the master LTDI chip, thereby limiting the use conditions of the LTDI chip in the thin film chip-on-film (COF) packaging and increasing the cost. Specifically, such approach of the current LTDI system will increase the number of pins of the inner lead bonding (ILB), thereby limiting the width limitation of the ILB (e.g., trace/wiring/layout width limitation), resulting in decrease of the yield of COF and increase of the cost of wafer production.

The present invention provides a LTDI system and a driving signal processing method thereof to improve the problems caused by the above-mentioned current LTDI system.

Figure 2:
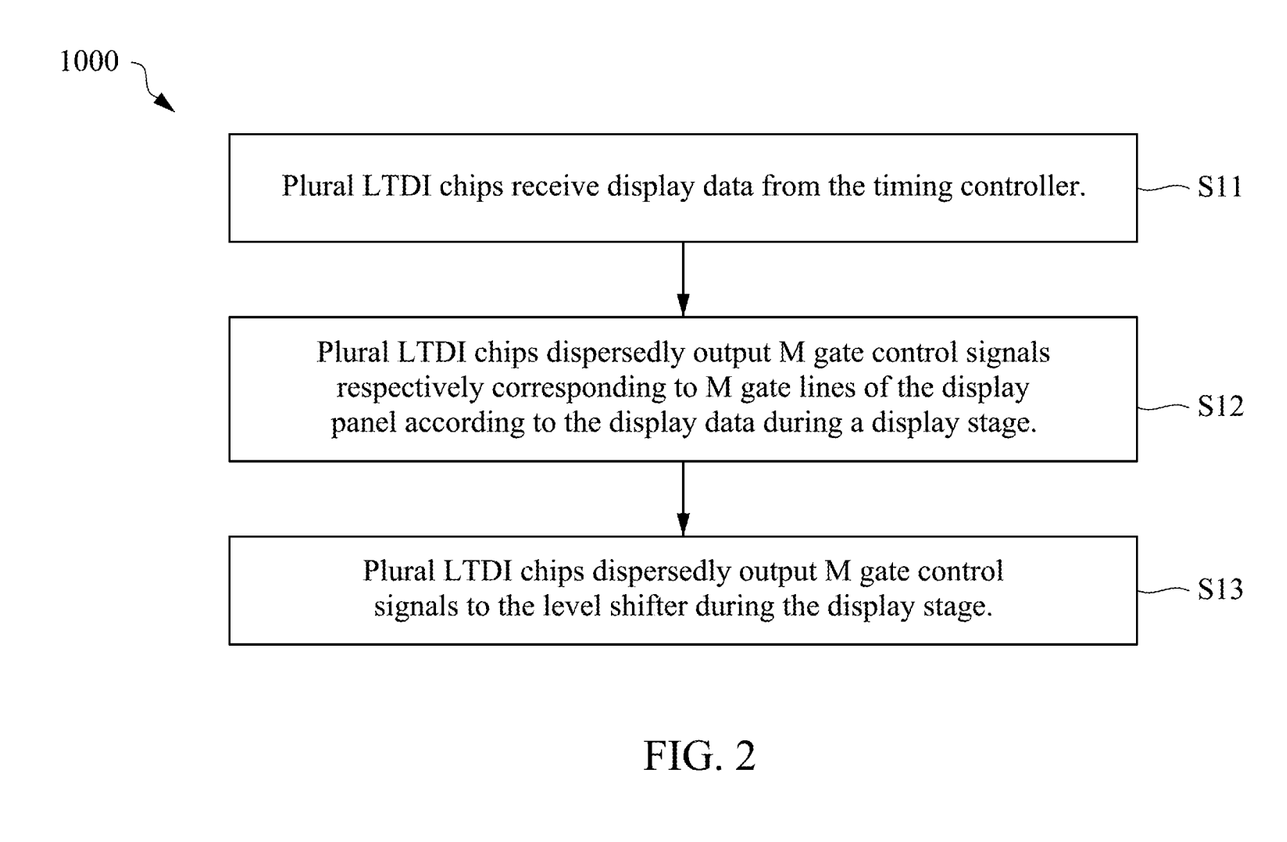
FIG. 2 illustrates a flowchart of a driving signal processing method of the LTDI system according to a first embodiment of the present invention.
Figure 3:
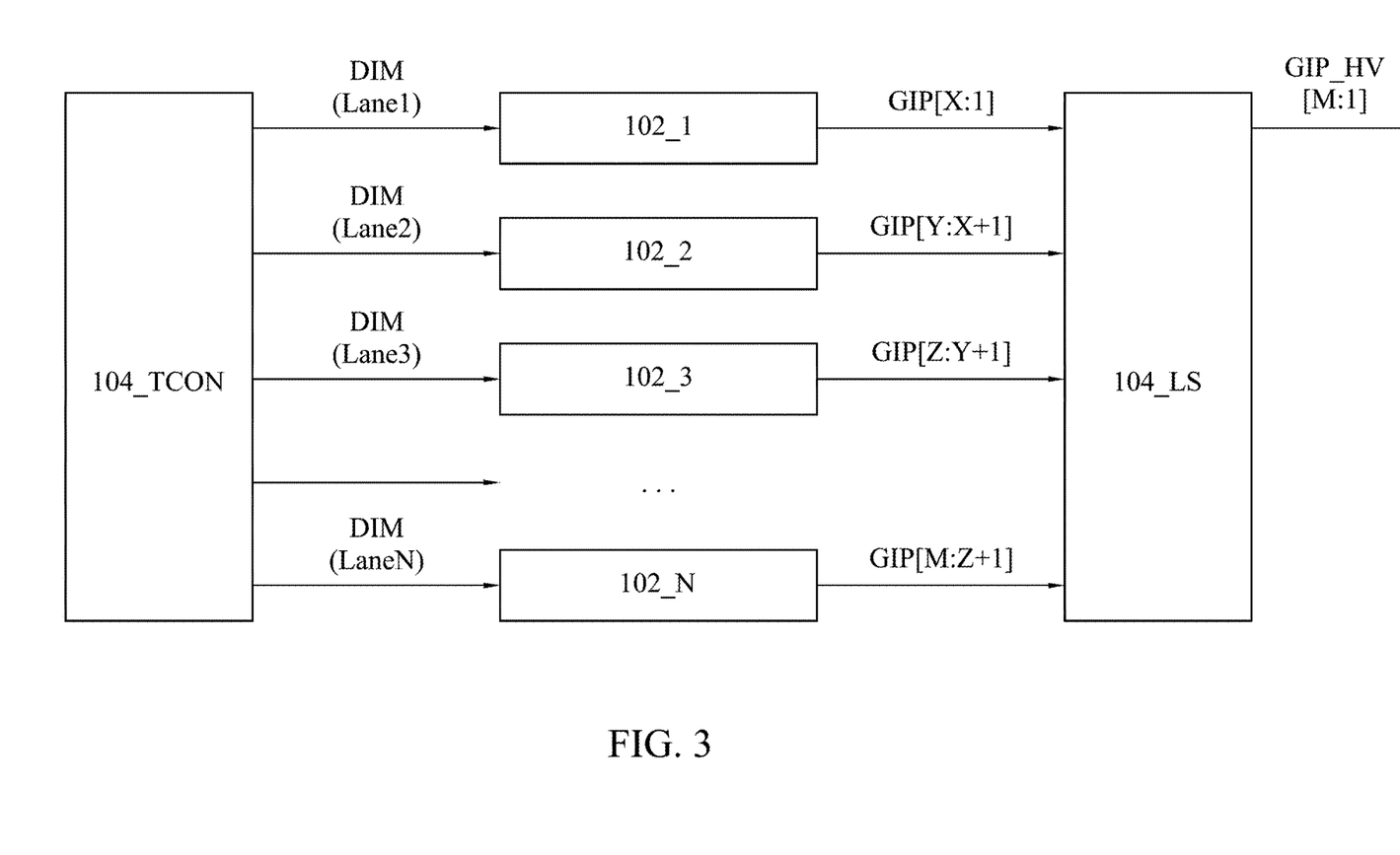
FIG. 3 illustrates a diagram of signal transmission of the LTDI chips corresponding to the driving signal processing method according to the first embodiment of the present invention.

FIG. 2 illustrates a flowchart of a driving signal processing method 1000 of the LTDI system 10 according to a first embodiment of the present invention. FIG. 3 illustrates a diagram of signal transmission of the LTDI chips 102_1~102_N corresponding to the driving signal processing method 1000 according to the first embodiment of the present invention. As shown in FIG. 2 and FIG. 3, in step S11, the LTDI chips 102_1~102_N receive display data DIM from the timing controller 104_TCON.

As shown in FIG. 2 and FIG. 3, in step S12, the LTDI chips 102_1~102_N dispersedly output M gate control signals according to the display data DIM received from the timing controller 104_TCON during a display stage of the display panel 102. M gate control signals respectively corresponding to M gate lines of the display panel 102. In other words, the display panel 102 includes M rows of display pixels. M gate control signals are sent to subsequent display elements, thereby providing gate driving signals to M gate lines of the display panel 102 so as to turn on one of rows of display pixels row by row.

As shown in FIG. 2 and FIG. 3, in step S13, the LTDI chips 102_1~102_N dispersedly output M gate control signals to the level shifter 104_LS of the PCB 104 during the display stage of the display panel 102. In the first embodiment of the present invention, each of the M gate control signals outputted to the level shifter 104_LS is an output selection signal GIP, such that the level shifter 104_LS selects one of on-voltage and off-voltage as the output voltage (i.e., the gate driving signal) to drive each of the gate lines of the display panel 102. In other words, the level shifter 104_LS is used to sequentially (i.e., starting from 1 to M) provide on-voltage or off-voltage to the M gate lines. The on-voltage is used to turn on the display pixels connected to the corresponding gate line and the off-voltage is used to turn off the display pixels connected to the corresponding gate line. The M gate driving signals outputted by the level shifter 104_LS are labeled as GIP HV[M:1] in FIG. 3.

In the first embodiment of the present invention, the gate driver of the display panel 102 is formed on a substrate of the display panel 102 through a gate-in-panel (GIP) manner.

It is worth mentioning that, in step S11, the display data received by one of the LTDI chips correspond to some rows of the display pixels connected to some gate lines corresponding to some gate control signals outputted by the one of the LTDI chips. For example, if the gate lines corresponding to the gate control signals (labeled as GIP[X:1] in FIG. 3) outputted by the LTDI chip 102_1 are connected to the display pixels in first to X-th rows, the display data received by the LTDI chip 102_1 from the timing controller 104_TCON correspond to the display pixels in first to X-th rows, in which the display data received by the LTDI chip 102_1 are labeled as DIM(Lane1) in FIG. 3. For example, if the gate lines corresponding to the gate control signals (labeled as GIP[Y:X+1] in FIG. 3) outputted by the LTDI chip 102_2 are connected to the display pixels in (X+1)-th to Y-th rows, the display data received by the LTDI chip 102_2 from the timing controller 104_TCON correspond to the display pixels in (X+1)-th to Y-th rows, in which the display data received by the LTDI chip 102_2 are labeled as DIM(Lane2) in FIG. 3. For example, if the gate lines corresponding to the gate control signals (labeled as GIP[Z:Y+1] in FIG. 3) outputted by the LTDI chip 102_3 are connected to the display pixels in (Y+1)-th to Z-th rows, the display data received by the LTDI chip 102_3 from the timing controller 104_TCON correspond to the display pixels in (Y+1)-th to Z-th rows, in which the display data received by the LTDI chip 102_3 are labeled as DIM(Lane3) in FIG. 3. For example, if the gate lines corresponding to the gate control signals (labeled as GIP[M:Z+1] in FIG. 3) outputted by the LTDI chip 102_N are connected to the display pixels in (Z+1)-th to M-th rows, the display data received by the LTDI chip 102_N from the timing controller 104_TCON correspond to the display pixels in (Z+1)-th to M-th rows, in which the display data received by the LTDI chip 102_N are labeled as DIM(LaneN) in FIG. 3.

In addition, since the display data DIM received by the LTDI chips 102_1~102_N from the timing controller 104_TCON includes a vertical synchronization signal (VSYNC), the LTDI chips 102_1~102_N may sequentially (starting from 1 to M) provide M gate control signals to the level shifter 104_LS through calculation.

In a preferred aspect of the first embodiment of the present invention, each of the LTDI chips 102_1~102_N is used to output M/N gate control signals, and N<M. In other words, in the preferred aspect of the first embodiment of the present invention, the quantities of gate control signals respectively output by the LTDI chips 102_1~102_N are the same, so as to preferably reduce the number of pins of each of the LTDI chips 102_1~102_N, but the present invention is not limited thereto. In the first embodiment of the present invention, the master LTDI chip 102_1 and at least one of the slave LTDI chips 102_2~102_N are used to output the gate control signals. In other aspects of the first embodiment of the present invention, the quantities of gate control signals respectively output by the LTDI chips 102_1~102_N may be different. In addition, in some other aspects of the first embodiment of the present invention, the master LTDI chip and at least one of the slave LTDI chips are used to output the gate control signals, while other slaves LTDI chips do not output gate control signals.

It is worth mentioning that, in the first embodiment of the present invention, the LTDI chip 102_1~102_N merely output the gate control signals to the level shifter 104_LS during the display stage of the display panel 102, and the LTDI chip 102_1~102_N do not output the gate control signals to the level shifter 104_LS during the touch sensing stage of the display panel 102.

Figure 4:
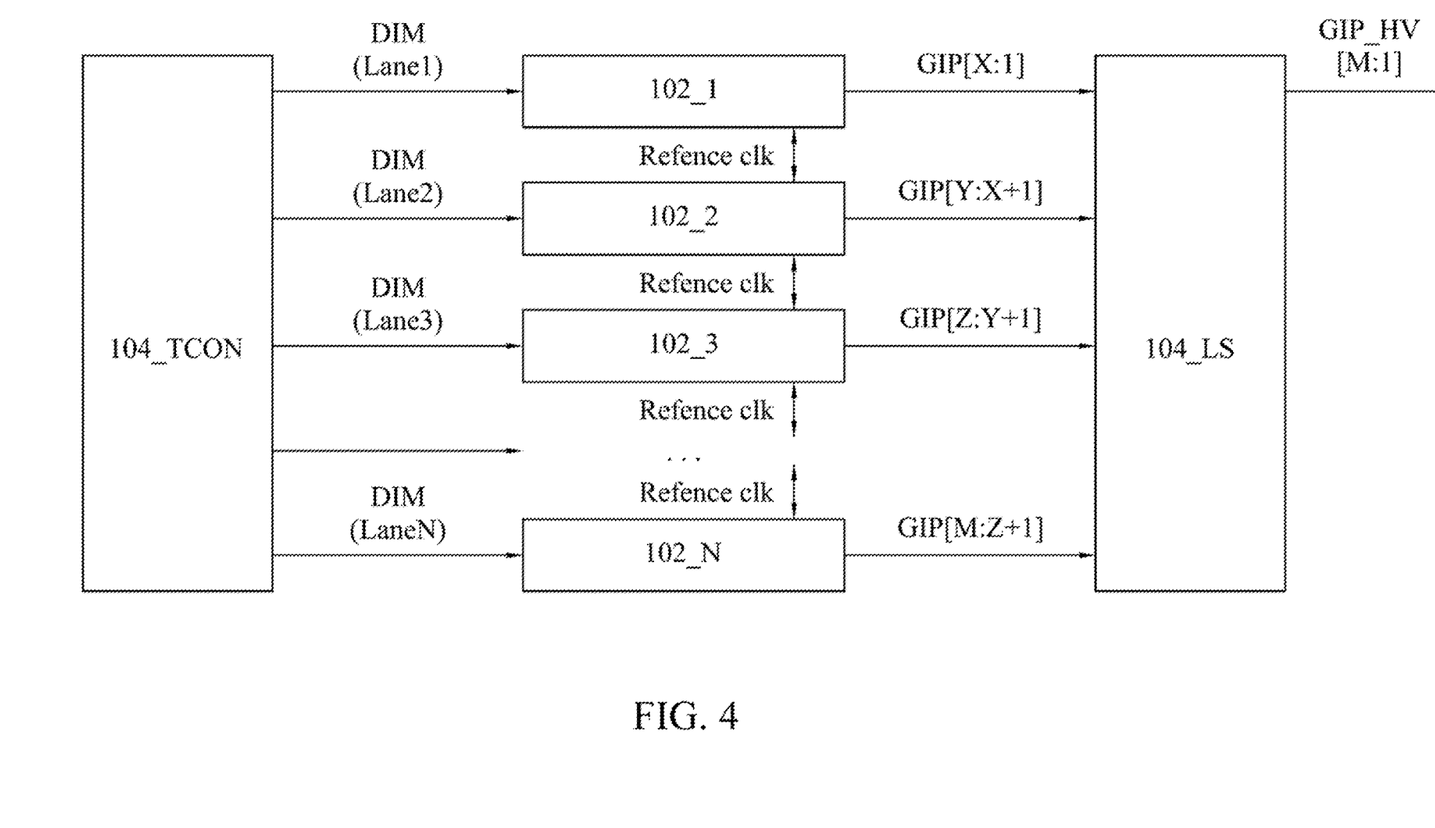
FIG. 4 illustrates a diagram of signal transmission of the LTDI chips corresponding to the driving signal processing method according to a second embodiment of the present invention.

FIG. 4 illustrates a diagram of signal transmission of the LTDI chips 102_1~102_N corresponding to the driving signal processing method 1000 according to a second embodiment of the present invention. FIG. 4 is similar to FIG. 3, and the difference between FIG. 4 and FIG. 3 is that, in the second embodiment of the present invention as shown in FIG. 4, the adjacent two of LTDI chips 102_1~102_N communicate through mutual reference clock signals (labeled as Reference clk in FIG. 4) to achieve synchronous communication, such that the LTDI chips 102_1~102_N can more accurately know the output timing of the M gate control signals so as to achieve more accurate output timing control. In addition, since the LTDI chips 102_1~102_N communicate with each other through the reference clock signal Reference clk, the LTDI chips 102_1~102_N may perform a spread spectrum modulation through the reference clock signal Reference clk so as to achieve a more flexible driving manner.

Figure 5:
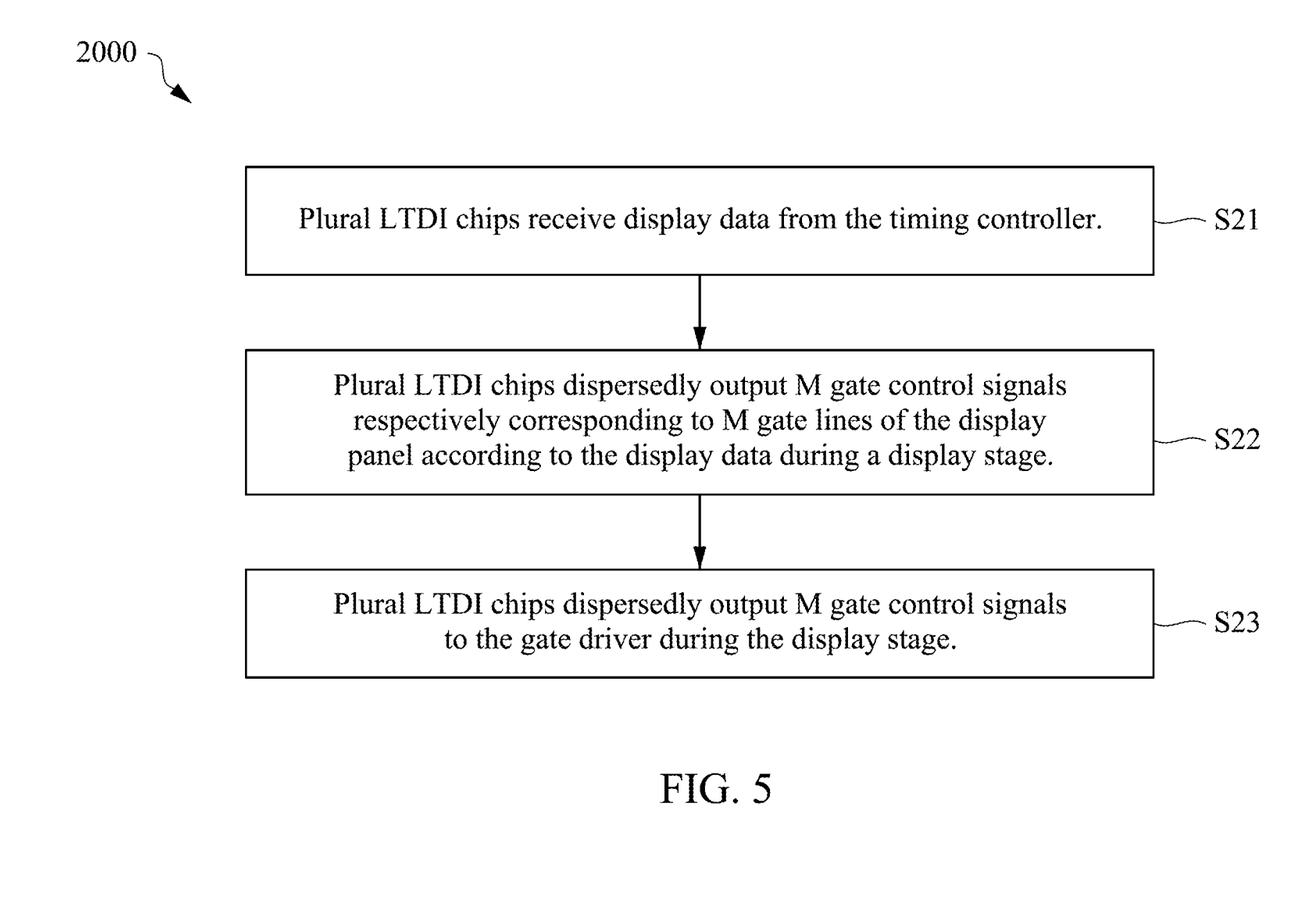
FIG. 5 illustrates a flowchart of a driving signal processing method of the LTDI system according to a third embodiment of the present invention.
Figure 6:
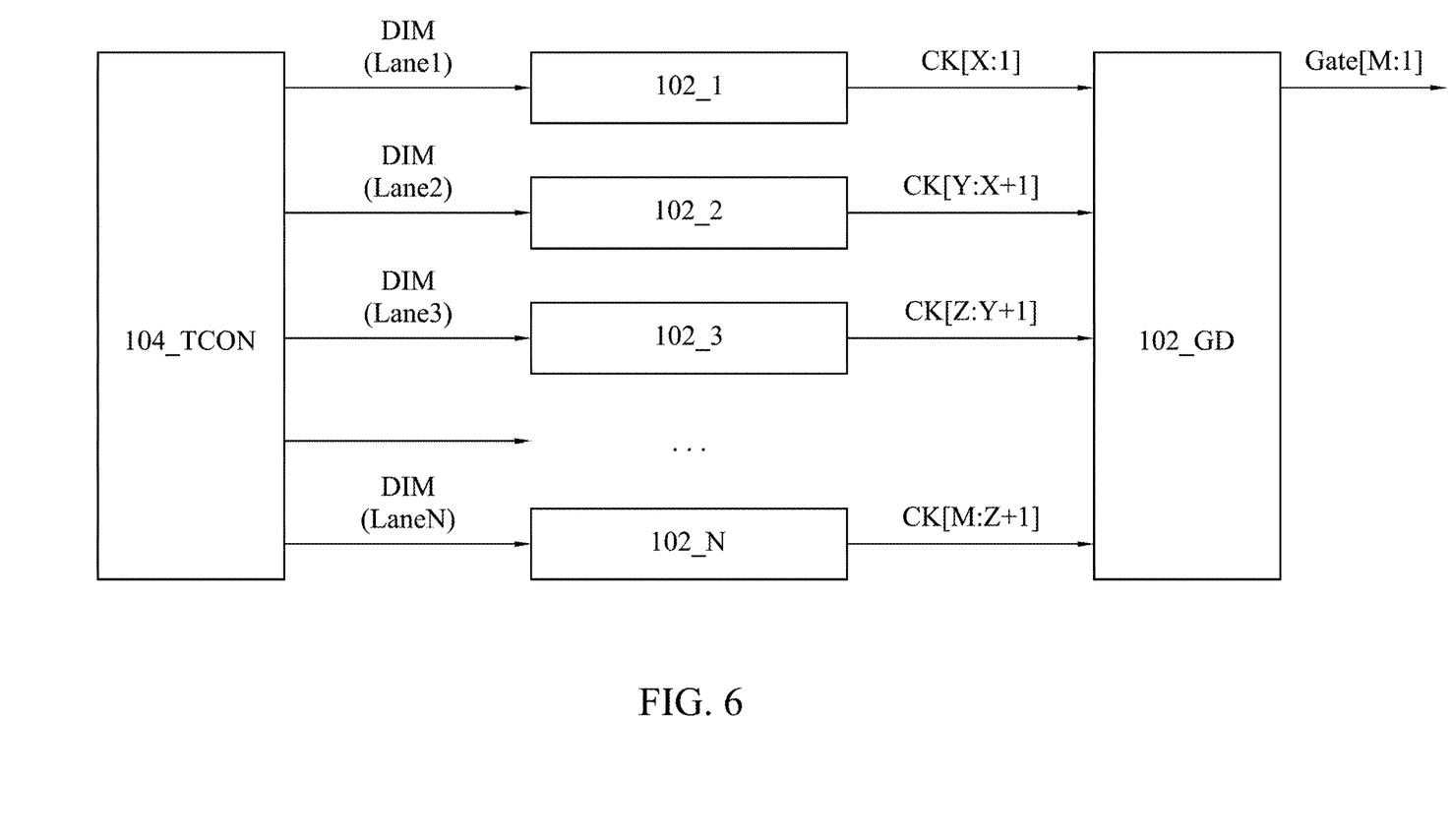
FIG. 6 illustrates a diagram of signal transmission of the LTDI chips corresponding to the driving signal processing method according to the third embodiment of the present invention.

FIG. 5 illustrates a flowchart of a driving signal processing method 2000 of the LTDI system 10 according to a third embodiment of the present invention. FIG. 6 illustrates a diagram of signal transmission of the LTDI chips 102_1~102_N corresponding to the driving signal processing method 2000 according to the third embodiment of the present invention. As shown in FIG. 5 and FIG. 6, in step S21, the LTDI chips 102_1~102_N receive display data DIM from the timing controller 104_TCON.

As shown in FIG. 5 and FIG. 6, in step S22, the LTDI chips 102_1~102_N dispersedly output M gate control signals according to the display data DIM received from the timing controller 104_TCON during a display stage of the display panel 102. M gate control signals respectively corresponding to M gate lines of the display panel 102. In other words, the display panel 102 includes M rows of display pixels. M gate control signals are sent to subsequent display elements, thereby providing gate driving signals to M gate lines of the display panel 102 so as to turn on one of rows of display pixels row by row.

As shown in FIG. 5 and FIG. 6, in step S23, the LTDI chips 102_1~102_N dispersedly output M gate control signals to the gate driver 102_GD of the display panel 102 during the display stage of the display panel 102, such that the gate driver 102_GD outputs gate driving signals to M gate lines of the display panel 102. In the third embodiment of the present invention, each of the gate control signals outputted from the LTDI chips 102_1~102_N to the gate driver 102_GD is a clock signal CK, but the present invention is not limited thereto. In the third embodiment of the present invention, each of the gate control signals outputted from the LTDI chips 102_1~102_N to the gate driver 102_GD may further include start pulse signal STV. The gate driver 102_GD generates gate driving signals (i.e., output clock signals) according to the clock signal CK and the start pulse signal STV to drive the gate lines of the display panel 102. The output clock signals outputted by the gate driver 102_GD are labeled as Gate[M:1] in FIG. 6.

In the third embodiment of the present invention, the gate driver 102_GD is formed on a substrate of the display panel 102 through a gate-in-panel (GIP) manner.

It is worth mentioning that, in step S21, the display data received by one of the LTDI chips correspond to some rows of the display pixels connected to some gate lines corresponding to some gate control signals outputted by the one of the LTDI chips. For example, if the gate lines corresponding to the gate control signals (labeled as CK[X:1] in FIG. 6) outputted by the LTDI chip 102_1 are connected to the display pixels in first to X-th rows, the display data received by the LTDI chip 102_1 from the timing controller 104_TCON correspond to the display pixels in first to X-th rows, in which the display data received by the LTDI chip 102_1 are labeled as DIM(Lane1) in FIG. 6. For example, if the gate lines corresponding to the gate control signals (labeled as CK[Y:X+1] in FIG. 6) outputted by the LTDI chip 102_2 are connected to the display pixels in (X+1)-th to Y-th rows, the display data received by the LTDI chip 102_2 from the timing controller 104_TCON correspond to the display pixels in (X+1)-th to Y-th rows, in which the display data received by the LTDI chip 102_2 are labeled as DIM(Lane2) in FIG. 6. For example, if the gate lines corresponding to the gate control signals (labeled as CK[Z:Y+1] in FIG. 6) outputted by the LTDI chip 102_3 are connected to the display pixels in (Y+1)-th to Z-th rows, the display data received by the LTDI chip 102_3 from the timing controller 104_TCON correspond to the display pixels in (Y+1)-th to Z-th rows, in which the display data received by the LTDI chip 102_3 are labeled as DIM(Lane3) in FIG. 6. For example, if the gate lines corresponding to the gate control signals (labeled as CK[M:Z+1] in FIG. 6) outputted by the LTDI chip 102_N are connected to the display pixels in (Z+1)-th to M-th rows, the display data received by the LTDI chip 102_N from the timing controller 104_TCON correspond to the display pixels in (Z+1)-th to M-th rows, in which the display data received by the LTDI chip 102_N are labeled as DIM(LaneN) in FIG. 6.

In addition, since the display data DIM received by the LTDI chips 102_1~102_N from the timing controller 104_TCON includes a vertical synchronization signal (VSYNC), the LTDI chips 102_1~102_N may sequentially (starting from 1 to M) provide M gate control signals to the gate driver 102_GD through calculation.

In a preferred aspect of the third embodiment of the present invention, each of the LTDI chips 102_1~102_N is used to output M/N gate control signals, and N<M. In other words, in the preferred aspect of the third embodiment of the present invention, the quantities of gate control signals respectively output by each of the LTDI chips 102_1~102_N are the same, so as to preferably reduce the number of pins of each of the LTDI chips 102_1~102_N, but the present invention is not limited thereto. In the third embodiment of the present invention, the master LTDI chip 102_1 and at least one of the slave LTDI chips 102_2~102_N are used to output the gate control signals. In other aspects of the third embodiment of the present invention, the quantities of gate control signals respectively output by the LTDI chips 102_1~102_N may be different. In addition, in some other aspects of the third embodiment of the present invention, the master LTDI chip and at least one of the slave LTDI chips are used to output the gate control signals, while other slaves LTDI chips do not output gate control signals.

It is worth mentioning that, in the third embodiment of the present invention, the LTDI chip 102_1~102_N merely output the gate control signals to the gate driver 102_GD during the display stage of the display panel 102, and the LTDI chip 102_1~102_N do not output the gate control signals to the gate driver 102_GD during the touch sensing stage of the display panel 102.

Figure 7:
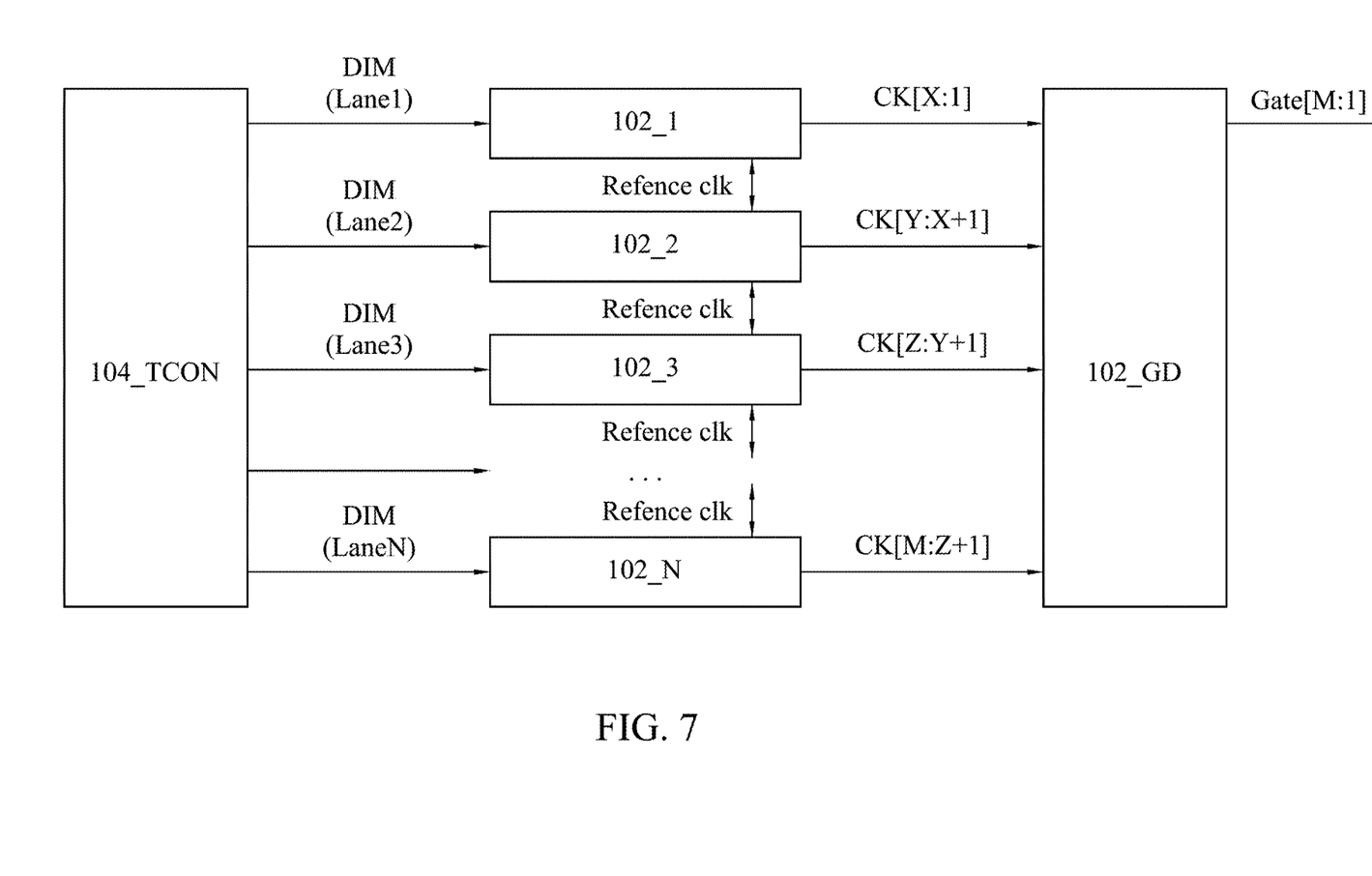
FIG. 7 illustrates a diagram of signal transmission of the LTDI chips corresponding to the driving signal processing method according to a fourth embodiment of the present invention.

FIG. 7 illustrates a diagram of signal transmission of the LTDI chips 102_1~102_N corresponding to the driving signal processing method 2000 according to a fourth embodiment of the present invention. FIG. 7 is similar to FIG. 6, and the difference between FIG. 7 and FIG. 6 is that, in the fourth embodiment of the present invention as shown in FIG. 7, the adjacent two of LTDI chips 102_1~102_N communicate through mutual reference clock signals (labeled as Reference clk in FIG. 7) to achieve synchronous communication, such that the LTDI chips 102_1~102_N can more accurately know the output timing of the M gate control signals so as to achieve more accurate output timing control. In addition, since the LTDI chips 102_1~102_N communicate with each other through the reference clock signal Reference clk, the LTDI chips 102_1~102_N may perform a spread spectrum modulation through the reference clock signal Reference clk so as to achieve a more flexible driving manner.

From the above description, the present invention provides a large touch display integrated (LTDI) system and a driving signal processing method thereof. A distributed architecture is used to share the output requirements of plural gate control signals through plural LTDI chips, thereby reducing the number of pins of each of the LTDI chips. Since the number of pins of each of the LTDI chips is reduced, the use conditions of each of the LTDI chips in the thin film chip-on-film (COF) package can be loosen and the cost can be reduced. Specifically, the approach of the present invention can reduce the number of pines of inner lead bonding (ILB), thereby reducing the width limitation of ILB (e.g., trace/wiring/layout width limitation), so as to effectively increase the yield of COF and reduce the cost of wafer production.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A driving signal processing method, used in a large touch display integrated (LTDI) system comprising a plurality of LTDI chips that are concatenated, comprising:
receiving, by the LTDI chips, display data from a timing controller, wherein the LTDI system includes an in-cell display panel and a printed circuit board (PCB), wherein the in-cell display panel includes the LTDI chips, wherein the PCB includes the timing controller, wherein the LTDI chips include a master LTDI chip and a plurality of slave LTDI chips; and
dispersedly outputting, by the master LTDI chip and at least one of the slave LTDI chips, M gate control signals respectively corresponding to M gate lines of the in-cell display panel according to the display data during a display stage of the in-cell display panel, wherein M is a positive integer greater than 1.

2. The driving signal processing method of claim 1, further comprising:
dispersedly outputting, by the master LTDI chip and the at least one of the slave LTDI chips, the M gate control signals to a level shifter of the PCB according to the display data during the display stage of the in-cell display panel, such that the level shifter correspondingly provides gate driving signals to the M gate lines of the in-cell display panel, wherein each of the M gate control signals is an output selection signal.

3. The driving signal processing method of claim 2, wherein a gate driver of the in-cell display panel is formed on a substrate of the in-cell display panel through a gate-in-panel (GIP) manner.

4. The driving signal processing method of claim 1, further comprising:
dispersedly outputting, by the master LTDI chip and the at least one of the slave LTDI chips, the M gate control signals to a gate driver of the in-cell display panel according to the display data during the display stage of the in-cell display panel, such that the gate driver correspondingly provides driving signals to the M gate lines of the in-cell display panel, wherein each of the Nil gate control signals is a clock signal.

5. The driving signal processing method of claim 4, wherein the gate driver is formed on a substrate of the in-cell display panel through a gate-in-panel (GIP) manner.

6. The driving signal processing method of claim 1, wherein the number of the LTDI chips is N, wherein N is a positive integer greater than 1 and N<M, wherein each of the LTDI chips is used to output M/N gate control signals.

7. The driving signal processing method of claim 1, wherein adjacent two of the LTDI chips communicate synchronously through a reference clock signal.

8. The driving signal processing method of claim 7, wherein the LTDI chips perform a spread spectrum modulation through the reference clock signal.

9. A large touch display integrated (LTDI) system, comprising:
a printed circuit board (PCB), comprising a timing controller; and
an in-cell display panel, comprising a plurality of LTDI chips that are concatenated, wherein the LTDI chips include a master LTDI chip and a plurality of slave LTDI chips;
wherein the LTDI chips receive display data from the tinting controller;
wherein the master LTDI chip and at least one of the slave LTDI chips dispersedly output M gate control signals respectively corresponding to M gate lines of the in-cell display panel according to the display data during a display stage of the in-cell display panel, wherein M is a positive integer greater than 1.

10. The LTDI system of claim 9, wherein the in-cell display panel is an in-cell liquid crystal display (LCD) panel, wherein the LTDI chips are connected through a serial peripheral interface, wherein each of the LTDI chips includes a touch microcontroller (MCU), a touch analog front end (AFE), and a source driver.

11. The LTDI system of claim 9, wherein the PCB further includes a level shifter, wherein the master LTDI chip and the at least one of the slave LTDI chips dispersedly output the M gate control signals to the level shifter according to the display data during the display stage of the in-cell display panel, such that the level shifter correspondingly provides gate driving signals to the M gate lines of the in-cell display panel, wherein each of the M gate control signals is an output selection signal.

12. The LTDI system of claim 11, wherein the in-cell display panel further includes a gate driver, wherein the gate driver is formed on a substrate of the in-cell display panel through a gate-in-panel (GIP) manner.

13. The LTDI system of claim 9, wherein the in-cell display panel further includes a gate driver, wherein the master LTDI chip and the at least one of the slave LTDI chips dispersedly output the M gate control signals to the gate driver according to the display data during the display stage of the in-cell display panel, such that the gate driver correspondingly provides driving signals to the M gate lines of the in-cell display panel, wherein each of the M gate control signals is a clock signal.

14. The LTDI system of claim 13, wherein the gate driver is formed on a substrate of the in-cell display panel through a gate-in-panel (GIP) manner.

15. The LTDI system of claim 9, wherein the number of the LTDI chips is N, wherein N is a positive integer greater than 1 and N<M, wherein each of the LTDI chips is used to output M/N gate control signals.

16. The LTDI system of claim 9, wherein adjacent two of the LTDI chips communicate synchronously through a reference clock signal.

17. The LTDI system of claim 16, wherein the LTDI chips perform a spread spectrum modulation through the reference clock signal.

* * * * *